(12) United States Patent
Itoh et al.

(10) Patent No.: US 9,868,594 B2
(45) Date of Patent: Jan. 16, 2018

(54) TRANSFER DEVICE CONTROLLER AND TRANSPORT DEVICE

(71) Applicant: ITOH DENKI CO., LTD., Kasai-shi, Hyogo (JP)

(72) Inventors: Kazuo Itoh, Kasai (JP); Masayuki Toma, Higashiosaka (JP); Yoshinori Nagai, Kasai (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/023,809

(22) PCT Filed: Sep. 25, 2014

(86) PCT No.: PCT/JP2014/075439
§ 371 (c)(1),
(2) Date: Mar. 22, 2016

(87) PCT Pub. No.: WO2015/046337
PCT Pub. Date: Apr. 2, 2015

(65) Prior Publication Data
US 2016/0236873 A1    Aug. 18, 2016

(30) Foreign Application Priority Data

Sep. 30, 2013 (JP) ................. 2013-204984

(51) Int. Cl.
| | | |
|---|---|---|
| *B65G 43/08* | (2006.01) | |
| *B65G 43/10* | (2006.01) | |
| *B65G 47/54* | (2006.01) | |

(52) U.S. Cl.
CPC ............. *B65G 43/10* (2013.01); *B65G 47/54* (2013.01); *B65G 2811/0673* (2013.01)

(58) Field of Classification Search
CPC ......... B65G 43/08; B65G 43/05; B65G 47/54
(Continued)

(56) References Cited

U.S. PATENT DOCUMENTS

| | | | |
|---|---|---|---|
| 5,984,498 A | | 11/1999 | Lem et al. |
| 6,005,211 A | * | 12/1999 | Huang ...................... B07C 3/02 |
| | | | 198/370.06 |

(Continued)

FOREIGN PATENT DOCUMENTS

| | | |
|---|---|---|
| JP | 08-324754 | 12/1996 |
| JP | 2001-356055 | 12/2001 |

(Continued)

OTHER PUBLICATIONS

International Search Report for PCT/JP2014/075439, dated Oct. 28, 2014.
International Preliminary Report on Patentability and Written Opinion, dated Apr. 5, 2016 in PCT/JP2014/075439.
Supplementary European Search Report, dated Apr. 24, 2017 in European Patent Application No. 14 84 9283.

*Primary Examiner* — Leslie A Nicholson, III
*Assistant Examiner* — Lester Rushin
(74) *Attorney, Agent, or Firm* — Wood, Phillips, Katz, Clark & Mortimer

(57) ABSTRACT

The present invention aims to develop a dedicated control device for a transfer apparatus and a transfer apparatus controller that enables labor-saving wiring work, and to provide a conveying apparatus that switches a destination to which a conveyed object is to be conveyed by way of the transfer apparatus controller.
A transfer apparatus includes a main conveying passage 101 that conveys a conveyed object 125 in one direction, an auxiliary conveying passage 102 for conveying a conveyed object 125 in a direction crossing the main conveying passage 101, and a lifting and lowering unit 115 that generates a height difference between both conveying passages 101 and 102 by lifting or lowering at least one of the conveying passages 101 and 102.
A transfer apparatus controller 50 is provided with a main conveying power transmission terminal 55, an auxiliary conveying power transmission terminal 56, a lifting and
(Continued)

lowering power transmission terminal 57, a power feed terminal 76 to which power is fed, a signal input unit 70, and one or more drive power generation circuits 52.

A discharge direction of the conveyed object 125 can be designated based on a signal input to the signal input unit 70, and when the discharge direction instruction signal is input, the conveying passage 101 or 102 located on top is driven.

27 Claims, 9 Drawing Sheets

(58) Field of Classification Search
USPC ...... 198/358, 370.06, 370.01, 370.02, 371.3, 198/369.6
See application file for complete search history.

(56) References Cited

U.S. PATENT DOCUMENTS

| | | |
|---|---|---|
| 6,085,892 A | 7/2000 | Lem et al. |
| 2006/0025266 A1 | 2/2006 | Itoh et al. |
| 2010/0179686 A1 | 7/2010 | Carlson et al. |
| 2012/0048678 A1 | 3/2012 | Itoh et al. |

FOREIGN PATENT DOCUMENTS

| | | |
|---|---|---|
| JP | 2003-285925 | 10/2003 |
| JP | 2006-044818 | 7/2004 |
| JP | 2006-312507 | 11/2006 |
| JP | 2010-137931 | 12/2008 |
| JP | 2012-051679 | 3/2012 |
| JP | 2012-051680 A | 3/2012 |

\* cited by examiner

TRANSFER DEVICE CONTROLLER AND TRANSPORT DEVICE

TECHNICAL FIELD

The present invention relates to an apparatus for activating a transfer apparatus mounted in a conveying apparatus such as a conveyer apparatus. The present invention also relates to a conveyer apparatus provided with the transfer apparatus.

BACKGROUND ART

In delivery centers of post service providers or home delivery service providers, a complicated conveying line is constructed by roller conveyers or belt conveyers.

Specifically, conveyer lines are disposed in multiple rows in delivery centers, and branch sections or convergence sections are formed on the conveyer lines, so that the conveyers are disposed like a net. Conveyed objects are sorted by destination.

An apparatus called a transfer apparatus is mounted on a branch section or a convergence section on a conveying line. A transfer apparatus is the one as disclosed in the patent document 1.

The outline of a conveying line and a transfer apparatus is generally as illustrated in FIG. 10. Specifically, the transfer apparatus 100 used in a delivery center includes a main conveying passage 101 and an auxiliary conveying passage 102. Here a "main conveying passage" and an "auxiliary conveying passage" are only described distinctively for facilitating description. Either one may be the "main conveying passage", and either one may be the "auxiliary conveying passage".

For example, in the transfer apparatus 100 illustrated in FIG. 10, a conveying passage including a plurality of thin belts 105 is defined as the main conveying passage 101, while a conveying passage including a plurality of rollers 103 is defined as the auxiliary conveying passage 102.

The main conveying passage 101 and the auxiliary conveying passage 102 are located on a same planar region.

The plurality of rollers 103 constituting the auxiliary conveying passage 102 are disposed parallel to one another with a constant space as illustrated in FIG. 10.

The plurality of rollers 103 constituting the auxiliary conveying passage 102 include a motor-incorporating roller and follower rollers, and an auxiliary conveying motor 111 is incorporated in the motor-incorporating roller.

Each of the plurality of thin belts 105 constituting the main conveying passage 101 is disposed between the rollers 103 of the auxiliary conveying passage 102. A main conveying motor 110 runs the plurality of thin belts 105 constituting the main conveying passage 101.

The plurality of thin belts 105 constituting the main conveying passage 101 and the plurality of rollers 103 constituting the auxiliary conveying passage 102 are attached to an individual frame.

The transfer apparatus 100 also includes a lifting and lowering device 112 for lifting and lowering the plurality of thin belts 105 constituting the main conveying passage 101 and the plurality of rollers 103 constituting the auxiliary conveying passage 102. The lifting and lowering device 112 is driven by a lifting and lowering motor 115.

The lifting and lowering device 112 lifts or lowers the main conveying passage 101 and the auxiliary conveying passage 102 to set a conveying surface of either of the conveying passages 101 and 102 to be on top.

A conveying surface position detection sensor 113 that detects which conveying surface is on top is provided.

For example, in a layout in which the main conveying passage 101 of the transfer apparatus 100 is disposed continuous with the main conveying line 120 of the conveyer line, and branching lines 121a and 121b are placed at the side of the transfer apparatus 100 as illustrated in FIG. 10, the transfer apparatus 100 activates the lifting and lowering device 112, and waits with the main conveying passage 101 being on top. When a conveyed object 125 is conveyed from an upstream conveyer 120a of the main conveying line 120, the main conveying motor 110 that drives the main conveying passage 101 is driven to run the plurality of thin belts 105, whereby the conveyed object 125 is received by the transfer apparatus 100 and placed on the main conveying passage 101.

When the conveyed object 125 is conveyed from the upstream side to the downstream side of the main conveying line 120, the lifting and lowering device 112 is unchanged to keep the state in which the main conveying passage 101 is on top, and the main conveying motor 110 keeps rotating to continue running of the thin belts 105. Consequently, the conveyed object 125 is conveyed from the upstream conveyer 120a to a downstream conveyer 120b of the main conveying line 120 through the transfer apparatus 100.

On the other hand, when a conveyed object 125 is to be discharged onto the branching line 121a, the lifting and lowering device 112 is activated with the state in which the transfer apparatus 100 receives the conveyed object 125. With this, the transfer apparatus 100 is changed such that the conveying surface of the auxiliary conveying passage 102 is located above the main conveying passage 101.

Thus, the conveyed object 125 is placed on the auxiliary conveying passage 102. That is, the conveyed object 125 is transferred onto the auxiliary conveying passage 102 from the main conveying passage 101.

Then, the auxiliary conveying motor 111 in the motor-incorporating roller is activated to rotate the plurality of rollers 103, whereby the conveyed object 125 is sent to the branching line 121a.

Meanwhile, as far as the present inventor knows, a dedicated control device for the transfer apparatus 100 is not commercially available, and each of three motors 110, 111, and 115 of the transfer apparatus 100 is controlled by an independent motor control device.

Specifically, the transfer apparatus 100 according to a prior art requires a main conveying motor control device 130 that controls the main conveying motor 110, an auxiliary conveying motor control device 131 that controls the auxiliary conveying motor 111, and a lifting and lowering motor control device 132 that controls the lifting and lowering motor 115 as illustrated in FIG. 10.

Notably, in the present specification, a "motor control device" or a "control device for motor" is a device that supplies drive power to a motor to control the motor.

As described above, the transfer apparatus 100 includes the main conveying passage 101, the auxiliary conveying passage 102, and the lifting and lowering device 112.

The main conveying passage 101 is driven by the main conveying motor 110, the auxiliary conveying passage 102 is driven by the auxiliary conveying motor 111, and the lifting and lowering device 112 is driven by the lifting and lowering motor 115.

In the prior art, the main conveying motor control device 130 that drives and controls the main conveying motor 110, the auxiliary conveying motor control device 131 that drives and controls the auxiliary conveying motor 111, and the lifting and lowering motor control device 132 that drives and controls the lifting and lowering motor 115 are essential.

If, for example, each of the motors 110, 111, and 115 employed in the transfer apparatus 100 is a brushless motor, and has a stator including a plurality of coils, current is successively flown through each coil to form a rotating magnetic field by the stators of the motors 110, 111, and 115. That is, each of the motor control devices 130, 131, and 132 has a motor drive circuit 135.

Each of the motor control devices 130, 131, and 132 also includes a circuit for controlling the motor drive circuit 135 to allow the motor to rotate at a desired rotation speed, and a CPU 136.

It is also provided with terminals for inputting a signal to allow the activation timing or stop timing of the motor to be controlled to match the timings of other devices or transmitting a signal necessary for adjacent devices. Specifically, each of the motor control devices 130, 131, and 132 is provided with a signal input terminal 137 and a signal output terminal 138.

Each motor control device is also provided with a power feed terminal 139 for inputting power for activating the motor drive circuit 135 and the CPU 136.

CITATION LIST

Patent Document

Patent Document 1: JP 2012-51680 A

DISCLOSURE OF INVENTION

Technical Problem

The conventional conveying line requires a minimum of three motor control devices 130, 131, and 132 for activating the transfer apparatus 100 as described above, and the work for external wirings thereof is troublesome.

Specifically, each of the motor control devices 130, 131, and 132 includes a power feed terminal 139, a plurality of signal input terminals 137, and a plurality of signal output terminals 138, and wiring lines have to be connected to each of these terminals.

This involves troublesome work for external wirings.

In view of this, under the consideration of the above problem of the prior art, the present invention aims to develop a dedicated control device for a transfer apparatus, and to develop a transfer apparatus controller that enables labor-saving wiring work. The present invention also aims to provide a conveying apparatus that can switch a destination of a conveyed object by the transfer apparatus controller.

Solution to Problem

To develop a transfer apparatus controller, the present inventors have analyzed in detail the operation of the above-mentioned transfer apparatus 100. As a result of the analysis, the present inventors have found that, although the transfer apparatus 100 includes three motors 110, 110, and 115, there is no timing at which the three motors 110, 111, and 115 have to simultaneously be driven.

Specifically, the transfer apparatus 100 receives the conveyed object 125 by driving the main conveying motor 110, and at that time, the main conveying passage 101 has to already wait at the upper side. Therefore, when receiving the conveyed object 125, the transfer apparatus 100 does not need to rotate the lifting and lowering motor 115. Rather, the lifting and lowering motor 115 should not be rotated when the transfer apparatus 100 receives the conveyed object 125.

Further, the auxiliary conveying motor 111 should not be rotated when the transfer apparatus 100 receives the conveyed object 125.

To change the conveying direction, the lifting and lowering motor 115 is rotated to change the vertical relation of conveying passages. In this case, the main conveying motor 110 and the auxiliary conveying motor 111 should not be rotated, but should keep stopped.

To discharge the conveyed object 125 from the transfer apparatus 100, only the conveying passage in the discharge direction has to run. Therefore, either one of the main conveying motor 110 and the auxiliary conveying motor 111 is rotated, and the other is stopped. The lifting and lowering motor 115 should not be rotated when the conveyed object 125 is discharged from the transfer apparatus 100.

In view of this, while the transfer apparatus 100 includes three motors 110, 111, and 115, each of the motors 110, 111, and 115 is driven independently, and the plurality of motors 110, 111, and 115 should not simultaneously be driven.

Accordingly, a CPU and the like can be shared. With the share of the CPU and the like, the number of signals which should be externally inputted is reduced, whereby the number of signal input terminals can be reduced. From the same reason, the number of signals which should be externally transmitted is reduced, whereby the number of signal output terminals can be reduced.

Further, the operation of each unit for linearly conveying a conveyed object and the operation of each unit for conveying a conveyed object to a branching passage are uniform, and they are performed in defined order. Therefore, when a series of operations is programmed in one control device, the need to externally receive and transmit signals is reduced, whereby the number of signal input terminals and the number of signal output terminals can further be reduced.

In addition, a power feed terminal can be shared.

The invention completed based on the above finding is a transfer apparatus controller that operates a transfer apparatus, the transfer apparatus including a main conveying passage that conveys a conveyed object in one direction, an auxiliary conveying passage that is located in a same planar region as the main conveying passage and conveys a conveyed object in a direction crossing the main conveying passage, a lifting and lowering unit that lifts or lowers at least one of the conveying passages so as to set a conveying surface of the at least one of the conveying passages to be located above a conveying surface of the other of the conveying passages, a main conveying motor that drives the main conveying passage, an auxiliary conveying motor that drives the auxiliary conveying passage, and a lifting and lowering power source that drives the lifting and lowering unit, the transfer apparatus controller including a main conveying power transmission terminal, an auxiliary conveying power transmission terminal, a lifting and lowering power transmission terminal, a power feed terminal to which power is fed, a signal input unit, and one or more drive power generation circuits, wherein the signal input unit is configured to input at least a conveyed object feed request signal, a discharge allowance signal, and a discharge direction instruction signal that includes at least a signal indicating curved conveyance for changing a conveying direction, wherein the transfer apparatus controller performs a feeding action to supply power from the drive power generation circuit to either one of the main conveying power transmission terminal and the auxiliary conveying power transmission terminal, at least under the condition that the conveyed object feed request signal is input, wherein the transfer apparatus controller performs a conveying passage switching action to supply power from the drive power generation circuit to the lifting and lowering power transmission terminal, under the condition that the discharge direction instruction signal indicates the curved conveyance, and wherein the transfer apparatus controller performs a discharging action to supply power from the drive power generation circuit to one of the conveying power transmission terminals connected to one of the conveying motors, the one of the conveying motors driving a conveying surface of one of the conveying passages that is located upper, under the condition that the discharge allowance signal is input.

According to the present invention, three motors and power source can be controlled with a single transfer apparatus controller.

In addition, the three motors and power source of the transfer apparatus can be driven on receipt of power from a set of power feed terminals, whereby external wirings of a power supply line can significantly be simplified.

Furthermore, signal transmission and signal reception with an external device can be reduced, whereby wiring of signal lines can be simplified.

Desirably, the transfer apparatus controller includes a signal output unit that transmits a signal indicating whether a conveyed object can be fed into the transfer apparatus or not, to the outside.

Desirably, the transfer apparatus includes a conveying surface position detection unit that detects which is at a upper position between a main conveying surface that is a conveying surface of the main conveying passage and an auxiliary conveying surface that is a conveying surface of the auxiliary conveying passage, wherein the signal input unit of the transfer apparatus controller is configured to input a signal from the conveying surface position detection unit.

Desirably, the discharge direction instruction signal that can be input includes a linear conveying signal for linearly conveying a conveyed object, wherein when the discharge direction instruction signal indicates linear conveyance, the transfer apparatus controller performs the feeding action and the discharging action without performing the conveying passage switching action.

Desirably, at least one of the drive power generation circuits can generate forward drive power for rotating a motor forward and backward drive power for rotating the motor backward, wherein the discharge direction instruction signal includes a right curve conveying signal for conveying a conveyed object to the right with curved conveyance and a left curve conveying signal for conveying a conveyed, object to the left with curved conveyance, and wherein power generated from the drive power generation circuit is switched between the forward drive power and the backward drive power, responding to whether the right curve conveying signal is input or whether the left curve conveying signal is input.

Desirably, the transfer apparatus includes a body-side object presence sensor that detects whether a conveyed object is present or not on the transfer apparatus, wherein the transfer apparatus controller is configured to input a signal from the body-side object presence sensor.

Desirably, the transfer apparatus controller performs the feeding action at least under the condition that absence of a conveyed object on the transfer apparatus is confirmed by the body-side object presence sensor.

Desirably, the transfer apparatus includes a peripheral object presence sensor that detects whether a conveyed object is present or not on a conveying passage therearound and the transfer apparatus controller is configured to input a signal from the peripheral object presence sensor.

Desirably, the transfer apparatus controller performs the discharging action at least under the condition that absence of a conveyed object on a conveying passage at a discharge side is confirmed by the peripheral object presence sensor.

The present invention can employ the configuration in which the transfer apparatus controller includes three or more drive power generation circuits and a control device, wherein each of the drive power generation circuits is connected to the main conveying power transmission terminal, the auxiliary conveying power transmission terminal, and the lifting and lowering power transmission terminal, and wherein the control device activates any of the drive power generation circuits according to a signal input from the signal input unit.

The present invention can also employ the configuration in which the transfer apparatus controller includes one or more drive power generation circuits, an output switching circuit, and a control device, wherein the output switching circuit is connected to the drive power generation circuit and two or more power transmission terminals, and wherein the control device activates the output switching circuit according to a signal input from the signal input unit to supply power to any of the two or more power transmission terminals.

Desirably, the conveying passage to which a conveyed object is fed and a feeding direction are selectable.

Desirably, the transfer apparatus controller starts or continues the feeding action for supplying power to the main conveying power transmission terminal from the drive power generation circuit under the condition that the following first conditions are all satisfied and any of the following second conditions is satisfied:

First Conditions (1) At least the main conveying passage out of the main conveying passage and the auxiliary conveying passage is located at a top position.

(2) The conveyed object feed request signal is input.

Second Conditions (1) The feeding action for supplying power to the main conveying power transmission terminal from the drive power generation circuit is actually implemented.

(2) The discharge allowance signal is input.

(3) A conveyed object is not present on the transfer apparatus.

Desirably, the transfer apparatus controller starts or continues the feeding action for supplying power to the main conveying power transmission terminal from the drive power generation circuit under the condition that the following first conditions are all satisfied:

First Conditions (1) At least the main conveying passage out of the main conveying passage and the auxiliary conveying passage is located at a top position.

(2) The discharge allowance signal is input.

(3) A conveyed object is present on the transfer apparatus.

Desirably, the transfer apparatus controller starts power supply to the auxiliary conveying power transmission terminal from the drive power generation circuit under the condition that the following first conditions are all satisfied:

First Conditions (1) At least the auxiliary conveying passage out of the main conveying passage and the auxiliary conveying passage is located at a top position.

(2) The discharge direction instruction signal indicating curved conveyance is input.

(3) A conveyed object is present on the transfer apparatus.

(4) The discharge allowance signal is input.

Desirably, the transfer apparatus controller starts the conveying passage switching action for supplying power to the lifting and lowering power transmission terminal from the drive power generation circuit under the condition that the following first condition is satisfied and the following second condition is satisfied:

First Condition (1) At least the auxiliary conveying passage out of the main conveying passage and the auxiliary conveying passage is located at a top position.

Second Condition (1) In the state in which the first condition is satisfied, power supply to the auxiliary conveying power transmission terminal has been performed.

Desirably, the transfer apparatus controller starts the conveying passage switching action for supplying power to the lifting and lowering power transmission terminal from the drive power generation circuit under the condition that the following first conditions are all satisfied:

First Conditions (1) At least the main conveying passage out of the main conveying passage and the auxiliary conveying passage is located at a top position.

(2) The discharge direction instruction signal indicating curved conveyance is input.

(3) A conveyed object is present on the transfer apparatus.

A conveying apparatus including a conveyer apparatus, a transfer apparatus, and each of the above transfer apparatus controllers is proposed.

Desirably, the conveyer apparatus includes a main conveying line and a branching line, wherein the transfer apparatus is provided between both of the main conveying line and the branching line, and wherein the conveyed object feed request signal is input to the signal input unit of the transfer apparatus controller when a conveyed object is present on an upstream line of the main conveying line just before the transfer apparatus.

Desirably, the conveyer apparatus includes a main conveying line and a branching line, wherein the transfer apparatus is provided between both of the main conveying line and the branching line, and wherein the discharge allowance signal is input to the signal input unit of the transfer apparatus controller in either of the following cases:

(1) A conveyed object is not present at the position closest to the transfer apparatus on either one of the main conveying line and the branching line that is designated as a discharge destination.

(2) The conveying line that is the closest to the transfer apparatus and that is designated as the discharge destination is driven.

Effect of Invention

The transfer apparatus controller according to the present invention enables reduction in external wirings, thereby facilitating installation work.

Since an internal device can be shared, the total number of components is smaller than that of the conventional configuration in which a controller is dedicatedly used.

DESCRIPTION OF EMBODIMENT

Figure 1:
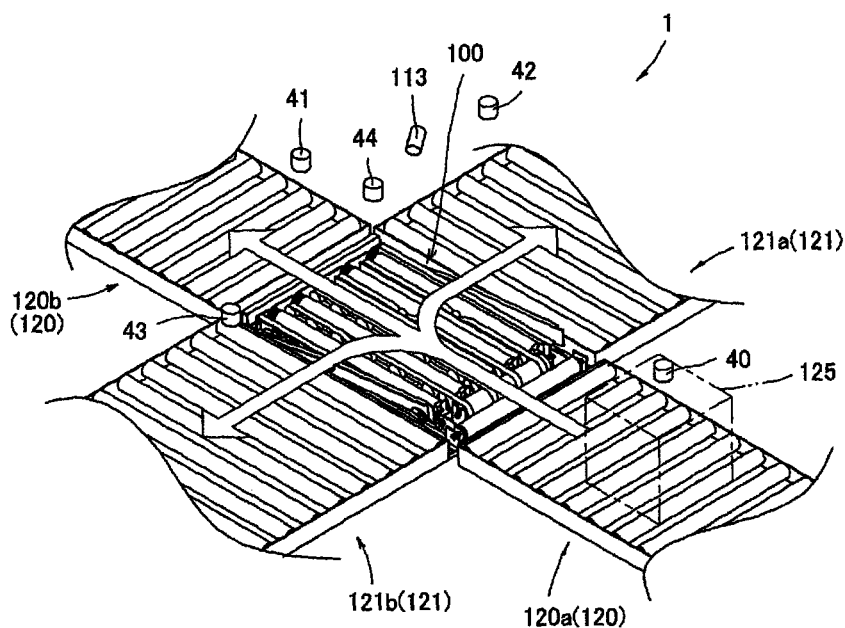
FIG. 1 is a perspective view illustrating a conveying apparatus according to an embodiment of the present invention.

An embodiment of the present invention will be described below. For easy understanding, components having similar function to those in the prior art are identified by the same reference numerals.

Figure 5:
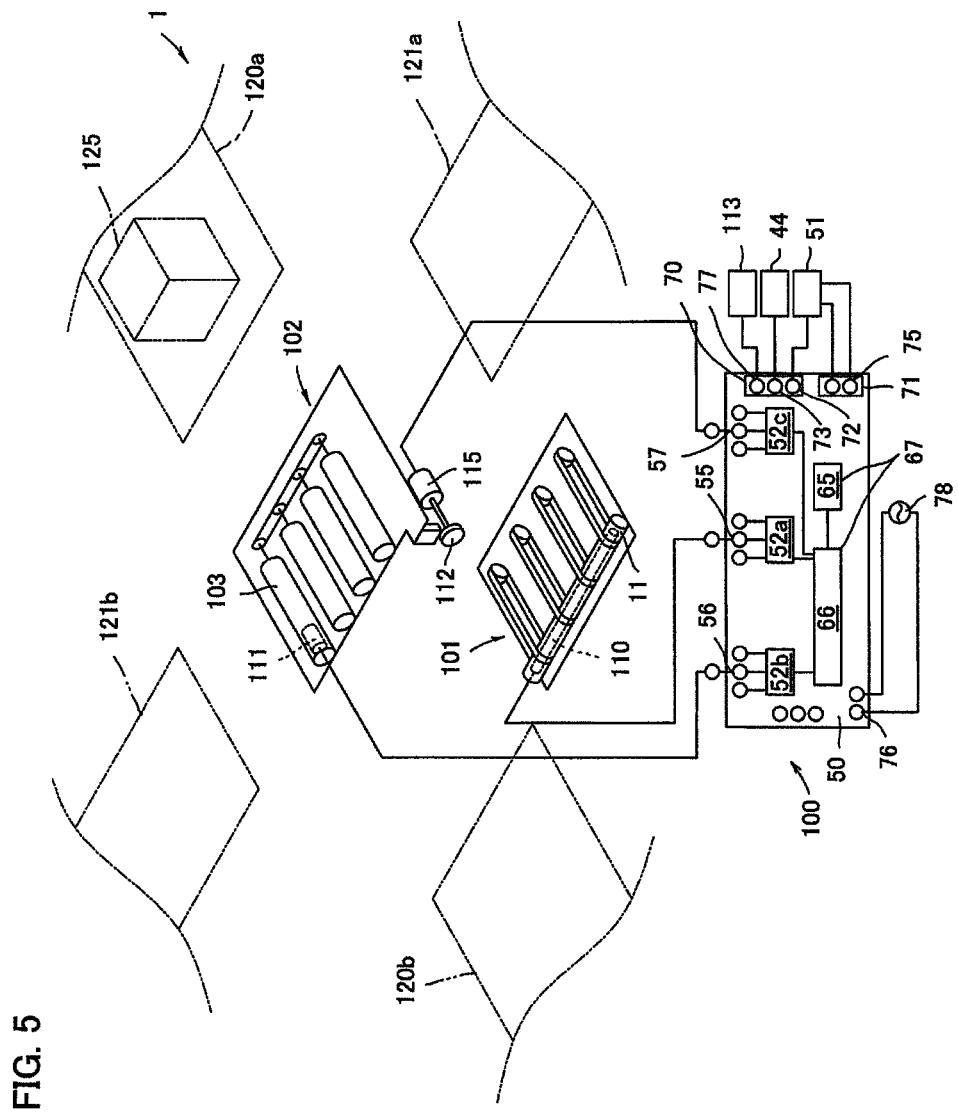
FIG. 5 is an explanatory modeled diagram of the conveying apparatus and a transfer apparatus controller according to an embodiment of the present invention.

A conveying apparatus 1 according to the present embodiment includes conveyer lines crossing each other as illustrated in FIGS. 1 and 5. Specifically, the conveying apparatus 1 includes a main conveying line 120 and a branching line 121, and a transfer apparatus 100 is provided between both lines.

The main conveying line 120 is a passage composed of an upstream conveyer 120a disposed in a row, the transfer apparatus 100, and a downstream conveyer 120b. The branching line 121 is a passage formed at the left and right of the transfer apparatus 100, and includes a right branching conveyer 121a and a left branching conveyer 121b.

The conveying apparatus 1 is able to directly convey a conveyed object 125 conveyed onto the transfer apparatus 100 from the upstream conveyer 120a to the downstream conveyer 120b, or is able to change the direction to convey the conveyed object 125 to the right branching conveyer 121a or the left branching conveyer 121b by the transfer apparatus 100. Specifically, the conveying apparatus 1 is able to linearly convey a conveyed object 125 or to change the conveying direction.

In the present embodiment, the upstream conveyer 120a, the downstream conveyer 120b, the right branching conveyer 121a, and the left branching conveyer 121b are roller conveyers including a plurality of rollers. These roller conveyers are configured such that a plurality of follower rollers are rotated through power transmission from a driving roller to convey each of placed conveyed objects 125 in one direction.

The transfer apparatus 100 is not much different from the one employed in the prior art, and includes a main conveying conveyer section 2 composing a main conveying passage 101 and an auxiliary conveying conveyer section 3 composing an auxiliary conveying passage 102.

Figure 2:
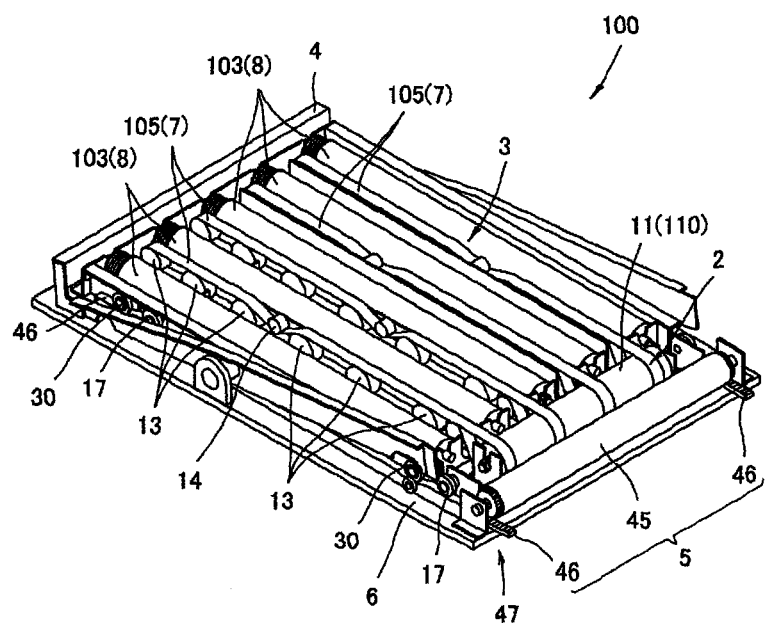
FIG. 2 is a perspective view illustrating a transfer apparatus employed in the conveying apparatus according to the present invention.

Specifically, as illustrated in FIG. 2, the transfer apparatus 100 includes the main conveying conveyer section 2, the auxiliary conveying conveyer section 3, a stopper 4, and a lifting and lowering mechanism 5, and these components are integrally stored in a frame, casing, or the like (not illustrated).

Figure 4:
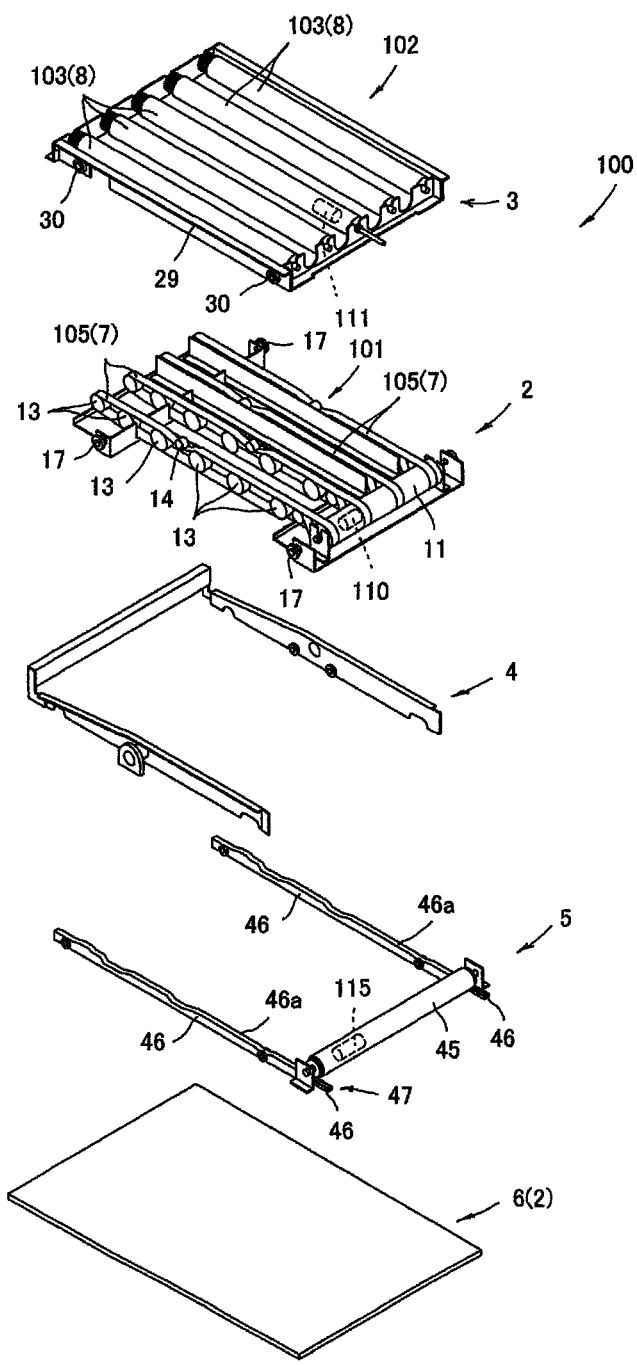
FIG. 4 is an exploded perspective view of the transfer apparatus illustrated in FIG. 2.

As illustrated in FIG. 4, the main conveying conveyer section 2 includes a belt driving roller 11, a plurality of thin belts 105, belt following rollers 13, a tension maintaining member 14, short rollers 17, and the like. These components are mounted into a main-conveying-side frame 6.

Thin belts 105 arranged in four rows are attached between the belt driving roller 11 and the belt following rollers 13. The belt driving roller 11 is a motor-incorporating roller, and includes a deceleration mechanism and a motor 110 in a rotatable outer cylinder. The motor 110 in the belt driving roller 11 functions as a main conveying motor 110.

When the main conveying motor 110 rotates, the belt driving roller 11 rotates, so that thin belts 105 in four rows synchronously run.

The plurality of belts 105 define a main conveying surface 7. That is, a surface of each belt 105 on which a conveyed object 125 (FIG. 1) is placed is disposed in the same plane (main conveying surface 7).

Figure 3:
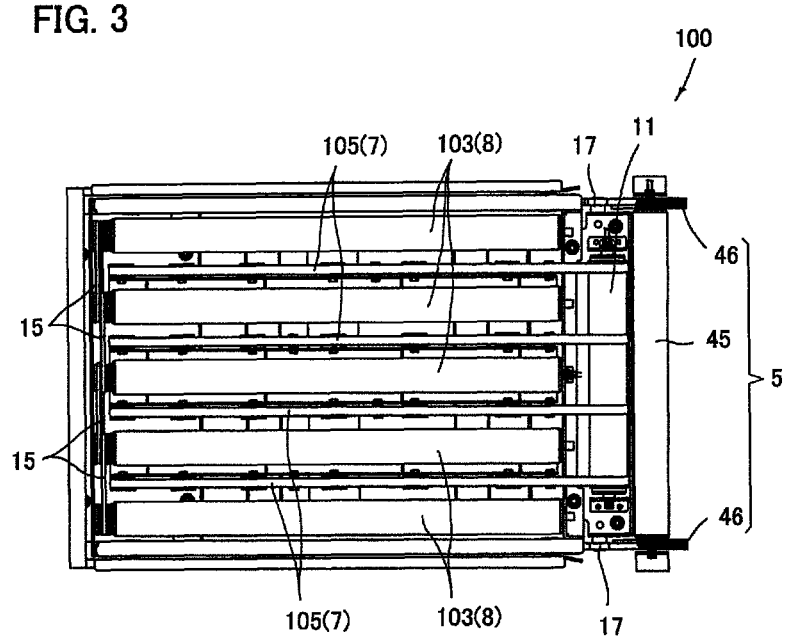
FIG. 3 is a plan view of the transfer apparatus illustrated in FIG. 2.

As illustrated in FIG. 4, the auxiliary conveying conveyer section 3 is a roller conveyer configured such that a plurality of rollers 103 are mounted into a frame 29. One of the plurality of rollers 103 is a motor-incorporating roller, and includes an auxiliary conveying motor 111 inside. The plurality of rollers 103 are connected with a belt 15 to be simultaneously operated as illustrated in FIG. 3.

The plurality of rollers 103 define an auxiliary conveying surface 8. That is, an upper end (a portion where a conveyed object 125 is placed) of each roller 103 is disposed in the same plane (auxiliary conveying surface 8).

Short rollers 30 are also provided in the frame 29 of the auxiliary conveying conveyer section 3.

The lifting and lowering mechanism 5 includes a horizontally movable member 46 and a lifting and lowering roller 45. The horizontally movable member 46 slides, and has a cam surface 46a on its upper part.

The lifting and lowering roller 45 is a motor-incorporating roller, and includes a lifting and lowering motor 115 inside. The lifting and lowering roller 45 and the horizontally movable member 46 are coupled with a rack and pinion 47. When the lifting and lowering motor 115 rotates, the horizontally movable member 46 horizontally moves. The cam surface 46a of the horizontally movable member 46 is engaged with the short rollers 17 of the main conveying conveyer section 2 and the short rollers 30 of the auxiliary conveying conveyer section 3. With this, when the lifting and lowering motor 115 is activated to move the horizontally movable member 46 horizontally, the main conveying conveyer section 2 and the auxiliary conveying conveyer section 3 vertically move with the action of the cam surface 46a. As a result, the main conveying passage 101 (main conveying surface 7) and the auxiliary conveying passage 102 (auxiliary conveying surface 8) are lifted and lowered, and one of them projects upward from the other. Actually, with the state in which one of the conveying passages is located above the other, the other conveying passage is lifted, and then, the one conveying passage is lowered.

In the present embodiment, a conveying surface position detection sensor 113 (FIG. 1) is provided as a conveying surface position detection unit. This sensor can detect which one of the main conveying conveyer section 2 and the auxiliary conveying conveyer section 3 is on top.

In the present embodiment, object presence sensors (peripheral object presence sensors) 40, 41, 42, 43, and 44 which detect whether a conveyed object 125 is present or not on peripheral conveying passages are provided on the transfer apparatus 100 and its peripheral conveyer apparatuses as illustrated in FIG. 1.

Specifically, an upstream object presence sensor 40 is provided on the upstream conveyer 120a of the main conveying line 120, and a downstream object presence sensor 41 is provided on the downstream conveyer 120b.

A right-branching-side object presence sensor 42 is provided on the right branching conveyer 121a of the branching line 121, and a left-branching-side object presence sensor 43 is provided on the left branching conveyer 121b.

A body-side object presence sensor 44 is provided on the transfer apparatus 100.

In the conveying apparatus 1 according to the present embodiment, the transfer apparatus 100 is controlled by one transfer apparatus controller 50 and a host control device 51 illustrated in FIG. 5. The host control device 51 is a known microcomputer, a programmable logic computer (PLC), or the like.

As illustrated in the block diagram in FIG. 5, the transfer apparatus controller 50 includes three motor drive circuits (drive power generation circuits) 52 (52a, 52b, 52c).

An output line of each of the motor drive circuits 52a, 52b, and 52c is connected to each of terminals 55, 56, and 57 provided to the transfer apparatus controller 50. Actually, the stator of each of the motors 110, 111, and 115 has three-phase coil, and each motor drive circuit (drive power generation circuit) 52 artificially creates three-phase AC. Therefore, although the motor drive circuit 52 has three output lines, the output lines are indicated by one line for facilitating the description. Accordingly, the illustrated line is not a single electric wire in actuality, but a wire group.

Figure 6:
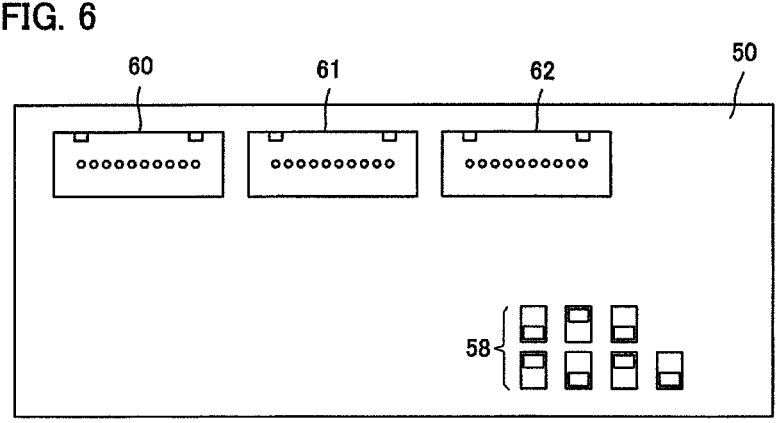
FIG. 6 is a front view illustrating the transfer apparatus controller according to an embodiment of the present invention.

Further, the terminals 55, 56, and 57 are terminal groups in actuality. That is, the transfer apparatus controller 50 includes three motor connectors 60, 61, and 62 as illustrated in FIG. 6. As illustrated in FIG. 6, the motor connectors 60, 61, and 62 constitute the terminals 55, 56, and 57 in the block diagram.

In the present embodiment, the destinations to which the terminals 55, 56, and 57 (motor connectors 60, 61, and 62) are connected are determined. Specifically, the terminal 55 which serves as a main conveying power transmission terminal 55 is connected to the main conveying motor 110. The terminal 56 which serves as an auxiliary conveying power transmission terminal 56 is connected to the auxiliary conveying motor 111. The terminal 57 which serves as a lifting and lowering power transmission terminal 57 is connected to the lifting and lowering motor 115.

The transfer apparatus controller 50 also includes a microcomputer 65 and a drive shaft switching circuit 66 inside. In the present embodiment, the microcomputer 65 and the drive shaft switching circuit 66 constitute a control circuit 67.

The control circuit 67 selects any of the motor drive circuits 52a, 52b, and 52c to be activated based on an external signal. Power is supplied to the terminal 55, 56, or 57 (motor connector 60, 61, or 62) to which the selected motor drive circuit 52a, 52b, or 52c is connected.

As illustrated in the block diagram in FIG. 5, the transfer apparatus controller 50 includes a signal input terminal group 70 and a signal output terminal group 71.

The signal input terminal group 70 includes a PLC input terminal 72 that receives a signal from the external host control device 51, an object presence sensor signal input terminal 73 connected to the body-side object presence sensor 44, and a lifting and lowering signal input terminal 77 to which a signal from the conveying surface position detection sensor 113 is input.

The signal output terminal group 71 includes a PLC output terminal 75 that transmits a signal to the host control device 51.

The transfer apparatus controller 50 is also provided with a power feed terminal 76 through which power is fed.

The transfer apparatus controller 50 according to the present embodiment receives a signal from the host control device 51, and the microcomputer 65 selects any of the motor drive circuits 52a, 52b, and 52c which should be activated based on the signal, and outputs a signal indicating the selection result to the drive shaft switching circuit 66 at a predetermined timing. The drive shaft switching circuit 66 activates any one of the motor drive circuits 52a, 52b, and 52c in response to the signal from the microcomputer 65. Then, power for driving the motor is output from the predetermined terminal 55, 56, or 57.

The transfer apparatus controller 50 is also provided with a DIP switch 58 (FIG. 6). The DIP switch 58 is used to change the layout of the conveying apparatus 1. The DIP switch 58 is for deciding a direction in which a conveyed object 125 is fed by the conveying apparatus 1 and a direction in which the conveyed object 125 is discharged by the conveying apparatus 1. Specifically, this switch is used to decide by which direction a conveyed object 125 is fed with using which conveying passage.

External wirings and function of the transfer apparatus controller 50 will be described below.

As illustrated in FIG. 5, the signal input terminal group 70 of the transfer apparatus controller 50 is connected to the host control device 51, the body-side object presence sensor 44, and the conveying surface position detection sensor 113. The signal output terminal group 71 of the transfer apparatus controller 50 is connected to the host control device 51 as illustrated in FIG. 5.

The main conveying power transmission terminal 55 is connected to the main conveying motor 110 of the transfer apparatus 100. The auxiliary conveying power transmission terminal 56 is connected to the auxiliary conveying motor 111 of the transfer apparatus 100. The lifting and lowering transmission power terminal 57 is connected to the lifting and lowering motor 115.

The power feed terminal 76 is connected to a commercial power supply 78.

Signals described below are transmitted from the host control device 51, and input to the signal input terminal group 70 of the transfer apparatus controller 50.

(1) Conveyed Object Feed Request Signal

A conveyed object feed request signal requests an acceptance of a conveyed object 125 onto the transfer apparatus 100 from the upstream conveyer 120a of the main conveying line 120.

This signal is transmitted from the host control device 51, when a conveyed object 125 is present on the upstream conveyer 120a of the main conveying line 120.

More specifically, this signal is transmitted from the host control device 51 under the condition that the upstream object presence sensor 40 provided on the upstream conveyer 120a detects a conveyed object 125.

From the viewpoint of the transfer apparatus controller 50, the conveyed object feed request signal can be a signal input to the signal input terminal group 70 of the transfer apparatus controller 50, when a conveyed object 125 is present on the upstream line of the main conveying line 120 just before the transfer apparatus 100.

(2) Discharge Direction Instruction Signal

A discharge direction instruction signal indicates a discharge direction of a conveyed object 125 fed into the transfer apparatus 100.

In the present embodiment, the discharge direction instruction signal includes a linear conveying signal for discharging a conveyed object 125 fed into the transfer apparatus. 100 into the downstream conveyer 120b, a right curve conveying signal for discharging the conveyed object 125 to the right branching conveyer 121a, and a left curve conveying signal for discharging the conveyed object 125 to the left branching conveyer 121b.

The discharge direction instruction signal is generated such that a bar code or the like not illustrated and attached to the conveyed object 125 is read by a reader not illustrated, and the signal of the bar code is transmitted to the host control device 51 and analyzed by the host control device 51.

(3) Discharge Allowance Signal

A discharge allowance signal is transmitted based on whether the discharge destination indicated by the discharge direction instruction signal is able to receive the conveyed object 125 or not.

The discharge allowance signal is transmitted from the host control device 51, when there is no conveyed object 125 on the conveyer of the discharge destination.

More specifically described, in the present embodiment, the downstream object presence sensor 41, the right-branching-side object presence sensor 42, and the left-branching-side object presence sensor 43 are provided as a peripheral object presence sensor detecting whether a conveyed object is present or not on conveying passages around the transfer apparatus 100.

Signals from the object presence sensors 41, 42, and 43 are directly or indirectly transmitted to the host control device 51. Then, the host control device 51 determines whether a conveyed object 125 is present or not on the conveyer of the discharge destination based on the signals from the object presence sensors 41, 42, and 43, and transmits the discharge allowance signal when a conveyed object 125 is not present on the conveyer of the discharge destination.

The discharge allowance signal is also transmitted when the conveyer of the discharge destination is driven.

From the viewpoint of the transfer apparatus controller 50, it can be said that the discharge allowance signal is input to the signal input terminal group 70 of the transfer apparatus controller 50 in either of the following cases.

(1) In the case where a conveyed object 125 is not present at the position closest to the transfer apparatus 100 on the conveying line that is the discharge destination.

(2) In the case where the conveying line which is the closest to the transfer apparatus 100 and designated as the discharge destination is driven.

On the other hand, the following signals are transmitted from the signal output terminal group 71 of the transfer apparatus controller 50. (1) Conveyed object acceptance allowance signal The transfer apparatus controller 50 has a signal output unit, and transmits a signal indicating whether a conveyed object 125 is able to be carried in the transfer apparatus 100 or not.

The conveyed object acceptance allowance signal is transmitted when a conveyed object 125 is not present on the transfer apparatus 100 and it is confirmed that the main conveying passage 101 (main conveying surface 7) is located above the auxiliary conveying passage 102 (auxiliary conveying surface 8).

The absence of a conveyed object 125 on the transfer apparatus 100 is confirmed based on the signal from the body-side object presence sensor 44.

The state in which the main conveying passage 101 (main conveying surface 7) is located above the auxiliary conveying passage 102 (auxiliary conveying surface 8) is confirmed by the conveying surface position detection sensor 113. That is, the transfer apparatus 100 includes the conveying surface position detection sensor 113 that directly or indirectly detects the vertical position of the main conveying passage 101 or the auxiliary conveying passage 102, and the above state is determined through an input of a signal from the sensor 113 to the transfer apparatus controller 50.

Alternatively, the rotation amount of the lifting and lowering motor 115 may be detected by the transfer apparatus controller 50 to indirectly detect the height of the main conveying passage 101 and the auxiliary conveying passage 102.

Still alternatively, when the main conveying passage 101 is driven, the conveyed object acceptance allowance signal may be transmitted.

The conveyed object acceptance allowance signal is transmitted from the transfer apparatus controller 50, when any of the following conditions is satisfied.

(1) Power is supplied to the main conveying power transmission terminal 55 from the drive power generation circuit (the case where the main conveying passage 101 is driven).

(2) The discharge allowance signal is externally input to the PLC input terminal 72 of the signal output terminal group 71.

(3) A conveyed object 125 is not present on the transfer apparatus 100.

Next, each signal and driving conditions of the motor drive circuits 52a, 52b, and 52c will be described. The motor drive circuit 52a for supplying power to the main conveying power transmission terminal 55 is activated under the state in which the conveyed object feed request signal is input as one condition, and under the state in which a conveyed object is acceptable.

In addition, the motor drive circuit 52a that supplies power to the main conveying power transmission terminal 55 is also activated when the discharge direction instruction signal is the linear conveying signal and the discharge allowance signal is issued.

In the case where all of the first conditions described below are satisfied, and either of the second conditions described below is satisfied, power is supplied to the main conveying power transmission terminal 55 from the drive power generation circuit. When power is already supplied to the main conveying power transmission terminal 55, this power supply is continued.

First Condition (1) The main conveying passage 101 of the transfer apparatus 100 is located at a top position. This may include the case where both the main conveying passage 101 and the auxiliary conveying passage 102 are located at the top position.

(2) The conveyed object feed request signal is externally input to the PLC input terminal 72 of the signal output terminal group 70.

Second Condition (1) Power is supplied to the main conveying power transmission terminal 55 from the drive power generation circuit (the case where the main conveying passage 101 is driven).

(2) The discharge allowance signal is externally input to the PLC input terminal 72 of the signal input terminal group 70.

(3) A conveyed object 125 is not present on the transfer apparatus 100.

In the case where all of the first conditions described below are satisfied as well, power is supplied to the main conveying power transmission terminal 55 from the drive power generation circuit.

First Condition (1) The main conveying passage 101 of the transfer apparatus 100 is located at a top position. This may include the case where both the main conveying passage 101 and the auxiliary conveying passage 102 are located at the top position.

(2) The discharge allowance signal is externally input to the PLC input terminal 72 of the signal input terminal group 70.

(3) A conveyed object 125 is present on the transfer apparatus 100.

The motor drive circuit 52b that supplies power to the auxiliary conveying power transmission terminal 56 is activated when the discharge direction instruction signal is the right curve conveying signal or the left curve conveying signal; the auxiliary conveying passage 102 is confirmed to be located above the main conveying passage 101; and the discharge allowance signal is issued.

In summary, power supply from the drive power generation circuit to the auxiliary conveying power transmission terminal 56 is started under the condition in which all of the first conditions described below are satisfied.

First Condition (1) The auxiliary conveying passage 102 of the transfer apparatus 100 is located at a top position. This may include the case where both the main conveying passage 101 and the auxiliary conveying passage 102 are located at the top position.

(2) The discharge direction instruction signal indicating curved conveyance is externally input to the PLC input terminal 72 of the signal input terminal group 70.

(3) A conveyed object 125 is present on the transfer apparatus 100.

(4) The discharge allowance signal is externally input to the PLC input terminal 72 of the signal input terminal group 70.

The motor drive circuit 52c that supplies power to the lifting and lowering power transmission terminal 57 is driven when the vertical relation between the main conveying passage 101 and the auxiliary conveying passage 102 is required to be switched.

Specifically described, after a conveyed object 125 is conveyed to the right branching conveyer 121a or the left branching conveyer 121b using the auxiliary conveying passage 102, the motor drive circuit 52c is activated to set the main conveying passage 101 to be located above the auxiliary conveying passage 102 for accepting a new conveyed object 125.

Also in the case where a conveyed object 125 is accepted on the main conveying passage 101, and then, this conveyed object 125 is to be discharged to the right branching conveyer 121a or the left branching conveyer 121b, the motor drive circuit 52c is activated to allow the auxiliary conveying passage 102 (auxiliary conveying surface 8) to be located above the main conveying passage 101 (main conveying surface 7).

Depending on the type of the transfer apparatus 100, the conveying apparatus 1 may have the structure in which the vertical relation between the main conveying passage 101 and the auxiliary conveying passage 102 is switched by changing the rotating direction of the lifting and lowering motor 115 or the structure in which the rotating direction of the lifting and lowering motor 115 is constant, and the vertical relation between the main conveying passage 101 and the auxiliary conveying passage 102 is switched by continuously rotating the lifting and lowering motor 115. The conveying apparatus 1 according to the present embodiment employs the structure in which the vertical relation between the main conveying passage 101 (main conveying surface 7) and the auxiliary conveying passage 102 (auxiliary conveying surface 8) is switched by changing the rotating direction of the lifting and lowering motor 115. Therefore, the motor drive circuit 52c can create power for rotating the motor forward and power for rotating the motor backward.

In summary, in the case where the first condition described below is satisfied, and the second condition described below is satisfied, power is supplied to the lifting and lowering power transmission terminal 57 from the drive power generation circuit.

First Condition (1) The auxiliary conveying passage 102 of the transfer apparatus 100 is located at a top position. This may include the case where both the main conveying passage 101 and the auxiliary conveying passage 102 are located at the top position.

Second Condition (1) In the state in which the first condition is satisfied, power supply to the auxiliary conveying power transmission terminal 57 has been performed.

The second condition is specified under the condition in which the auxiliary conveying passage 102 has been used for discharge. The period of the power supply to the auxiliary conveying power transmission terminal 57 may be a fixed time determined by a timer, or the power supply may be continued until the presence of a conveyed object 125 is confirmed or whether a conveyed object 125 is discharged from the transfer apparatus 100 or not is confirmed by any one the object presence sensors (peripheral object presence sensor) 40, 41, 42, 43, and 44.

In the case where all of the first conditions described below are satisfied as well, power is supplied to the lifting and lowering power transmission terminal 57 from the drive power generation circuit.

First Condition (1) The main conveying passage 101 of the transfer apparatus 100 is located at a top position. This may include the case where both the main conveying passage 101 and the auxiliary conveying passage 102 are located at the top position.

(2) The discharge direction instruction signal indicating curved conveyance is externally input to the PLC input terminal 72 of the signal input terminal group 70.

(3) A conveyed object 125 is present on the transfer apparatus 100.

Figure 7:
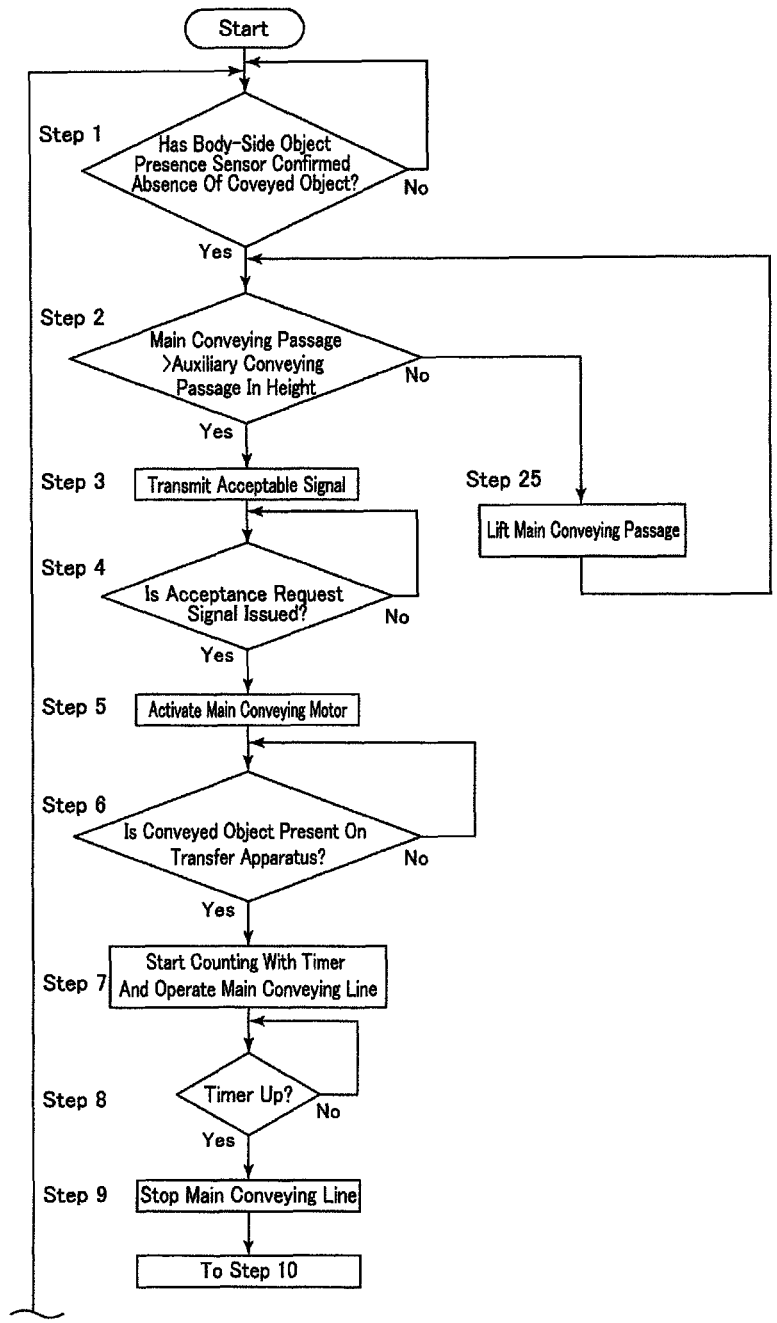
FIG. 7 is a flowchart illustrating an operation of the conveying apparatus according to an embodiment of the present invention, the flowchart illustrating a process until a conveyed object is transferred to the transfer apparatus.
Figure 8:
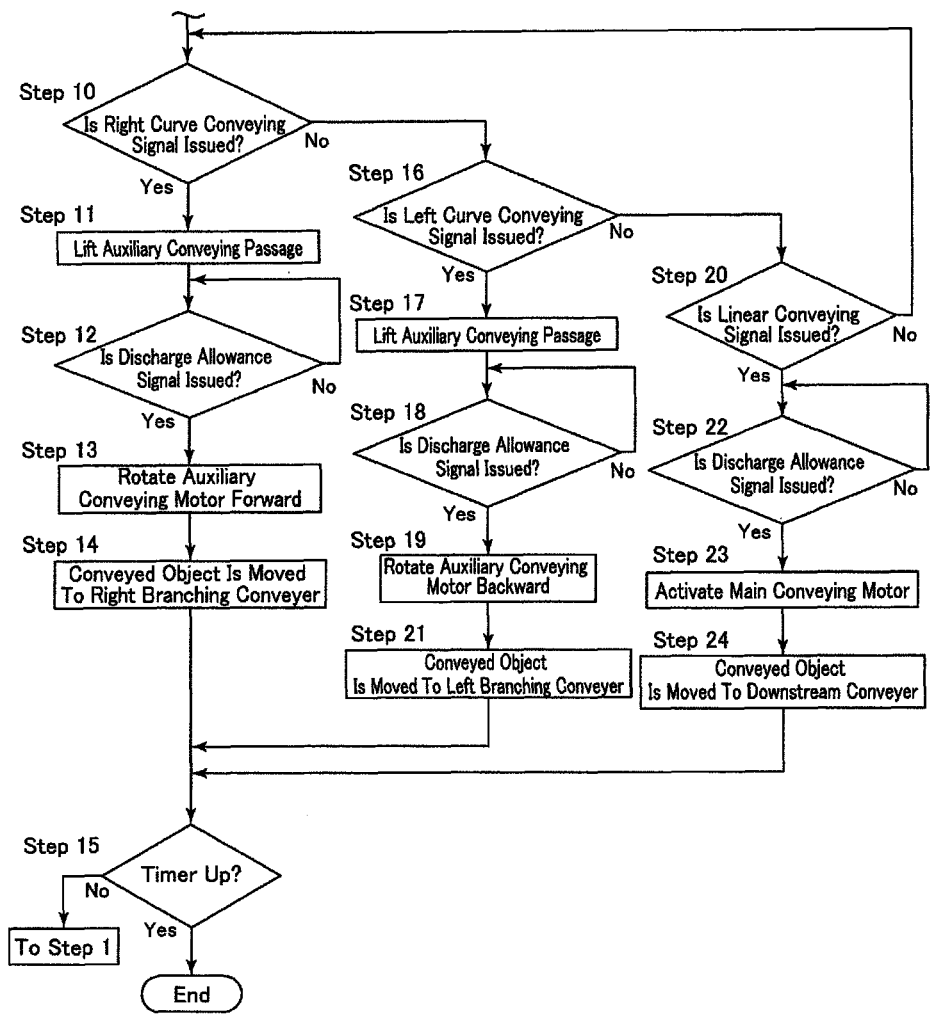
FIG. 8 is a flowchart following FIG. 7, and illustrates a process of discharging a conveyed object from the transfer apparatus.

Next, the operations of the transfer apparatus controller 50 and the transfer apparatus 100 when a conveyed object 125 is conveyed using the conveying apparatus 1 will be described with reference to the flowcharts in FIGS. 7 and 8.

The transfer apparatus controller 50 makes preparation for accepting a conveyed object 125 in steps 1 to 4. Specifically, it is confirmed in step 1 that the body-side object presence sensor 44 does not detect a conveyed object 125. After absence of a conveyed object 125 on the transfer apparatus 100 is confirmed, the process proceeds to step 2 where a signal from the conveying surface position detection sensor 113 is confirmed.

When it is confirmed that the main conveying passage 101 (main conveying surface 7) is located above the auxiliary conveying passage 102 (auxiliary conveying surface 8) based on the signal from the conveying surface position detection sensor 113 input to the lifting and lowering sensor signal input terminal 77, the transfer apparatus controller 50 proceeds to step 3 to transmit an acceptable signal from the signal output terminal group 71.

When the main conveying passage 101 (main conveying surface 7) is located below the auxiliary conveying passage 102 (auxiliary conveying surface 8), the process temporarily proceeds to step 25 where the motor drive circuit 52c is activated to supply power to the lifting and lowering power transmission terminal 57, whereby the lifting and lowering motor 115 is activated to move the main conveying passage 101 upward.

In step 4 following step 3, the transfer apparatus controller 50 waits for an acceptance request signal (conveyed object feed request signal) from the host control device 51. When a conveyed object 125 is present on the upstream conveyer 120a of the main conveying line 120, the acceptance request signal is transmitted from the host control device 51.

When receiving the acceptance request signal (conveyed object feed request signal), the transfer apparatus controller 50 proceeds to step 5 to activate the motor drive circuit 52a to supply current to the main conveying power transmission terminal 55, thereby activating the main conveying motor 110 of the transfer apparatus 100 to run the plurality of thin belts 105. Simultaneously, the upstream conveyer 120a of the main conveying line 120 is activated, whereby the conveyed object 125 is conveyed from the upstream conveyer 120a to the transfer apparatus 100.

When it is detected in step 6 that the conveyed object 125 is fed into the transfer apparatus 100 by the body-side object presence sensor 44, a timer starts to count in step 7, and current is continuously supplied to the main conveying power transmission terminal 55 until a certain period of time has elapsed in step 8 to draw the conveyed object 125 to a predetermined position. After a certain period of time has elapsed, the process proceeds to step 9 where the supply of electric current to the main conveying power transmission terminal 55 is stopped to stop the main conveying line 120.

Then, in steps 10, 16, and 20, the transfer apparatus controller 50 confirms the type of a discharge direction instruction signal. The transfer apparatus controller 50 then appropriately operates the transfer apparatus 100 according to the type of the discharge direction instruction signal.

Specifically, when it is determined in step 10 that the discharge direction instruction signal is a right curve conveying signal, the transfer apparatus controller 50 proceeds to step 11 to supply electric current to the lifting and lowering power transmission terminal 57 in order to switch the vertical relation between the main conveying passage 101 and the auxiliary conveying passage 102. With this, the auxiliary conveying passage 102 (auxiliary conveying surface 8) is raised above the main conveying passage 101 (main conveying surface 7).

As a result, the conveyed object 125 on the transfer apparatus 100 is transferred to the auxiliary conveying passage 102 (auxiliary conveying surface 8) from the main conveying passage 101 (main conveying surface 7).

The transfer apparatus controller 50 then proceeds to step 12 to wait for a discharge allowance signal. Here, the discharge direction is right, and when a conveyed object 125 is not present on the right branching conveyer 121a, or when the right branching conveyer 121a is activated, a discharge allowance signal is issued from the host control device 51. After confirming the discharge allowance signal, the transfer apparatus controller 50 proceeds to step 13 to supply electric current to the auxiliary conveying power transmission terminal 56 in the forward direction. Specifically, the transfer apparatus controller 50 rotates the auxiliary conveying motor 111 forward to rotate the rollers, thereby moving the conveyed object 125 toward the right branching conveyer 121a.

In steps 13 and 14, the transfer apparatus controller 50 keeps the rotation of the auxiliary conveying motor 111 for a certain period of time to completely transfer the conveyed object 125 to the right branching conveyer 121a.

When it is determined in the above steps 10, 16 and 20 that, as a result of the confirmation as to the type of the discharge direction instruction signal, the discharge direction instruction signal is a left curve conveying signal, the transfer apparatus controller 50 proceeds to step 17 to supply electric current to the lifting and lowering power transmission terminal 57 in order to switch the vertical relation between the main conveying passage 101 (main conveying surface 7) and the auxiliary conveying passage 102 (auxiliary conveying surface 8). With this, the auxiliary conveying passage 102 (auxiliary conveying surface 8) is raised above the main conveying passage 101 (main conveying surface 7).

The transfer apparatus controller 50 then proceeds to step 18 to wait for a discharge allowance signal. Here, the discharge direction is left, and when a conveyed object 125 is not present on the left branching conveyer 121b, or when the left branching conveyer 121b is activated, a discharge allowance signal is issued from the host control device 51. After confirming the discharge allowance signal, the transfer apparatus controller 50 proceeds to step 19 to supply electric current to the auxiliary conveying power transmission terminal 56 in the backward direction. Specifically, the transfer apparatus controller 50 rotates the auxiliary conveying motor 111 backward to move the conveyed object 125 toward the left branching conveyer 121b.

In steps 19 and 21, the transfer apparatus controller 50 keeps the rotation of the auxiliary conveying motor 111 for a certain period of time to completely transfer the conveyed object 125 to the left branching conveyer 121b.

When it is determined in the above steps 10, 16, and 20 that the discharge direction instruction signal is a linear signal as a result of the confirmation of the type of the discharge direction instruction signal, the transfer apparatus controller 50 proceeds to step 22 to wait for a discharge allowance signal. Here, the discharge direction is straight, and when a conveyed object 125 is not present on the downstream conveyer 120b, or when the downstream conveyer 120b is activated, a discharge allowance signal is issued from the host control device 51. After confirming the discharge allowance signal, the transfer apparatus controller 50 proceeds to step 23 to activate the motor drive circuit 52a to supply electric current to the main conveying power transmission terminal 55, thereby activating the main conveying motor 110 of the transfer apparatus 100 to rotate the rollers 103. In steps 23 and 24, the transfer apparatus controller 50 keeps the rotation of the main conveying motor 110 for a certain period of time to completely transfer the conveyed object 125 to the downstream conveyer 120b.

As described above, according to the present embodiment, the transfer apparatus 100 can be controlled with a single transfer apparatus controller 50. Therefore, external wiring is simplified, whereby installation work is facilitated.

In the embodiment described above, the conveying passage using belts 105 is defined as the main conveying passage 101 and used to feed a conveyed object 125, and the conveying passage using rollers 103 is defined as the auxiliary conveying passage 102 and used to distribute a conveyed object 125. However, a conveyed object 125 may be fed from the conveying passage using rollers 103. From which passage a conveyed object 125 is fed can be set by switching the DIP switch 58. Which side of the main conveying passage 101 is defined as upstream and which side is defined as downstream can also be set by switching the DIP switch 58.

In the embodiment described above, the transfer apparatus 100 is mounted at a crossroad section. However, the transfer apparatus 100 may be mounted at a "T-shaped intersection".

In the embodiment described above, the host control device 51 is provided, and a signal is transmitted to the transfer apparatus controller 50 from the host control device 51. However, a signal can directly be transmitted to the transfer apparatus controller 50 from a control device of adjacent conveyer. In this case, each signal is input to the PLC input terminal 72 of the signal output terminal group 71, or an input terminal in place of the PLC input terminal 72.

Figure 9:
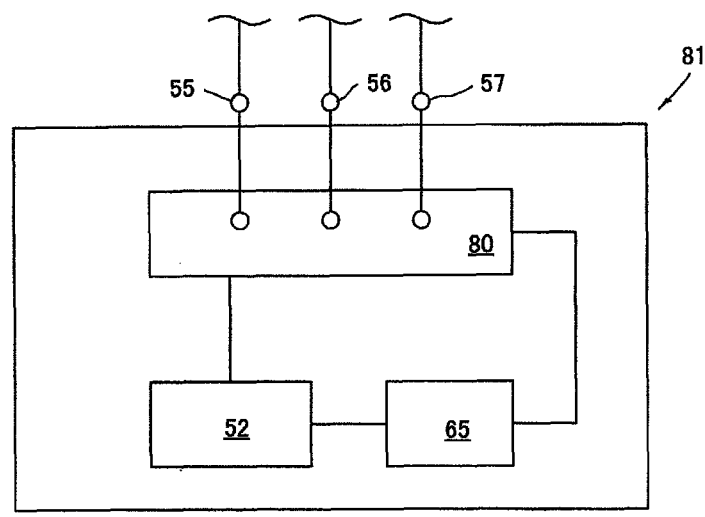
FIG. 9 is an explanatory modeled diagram of a conveying apparatus and a transfer apparatus controller according to another embodiment of the present invention.
Figure 10:
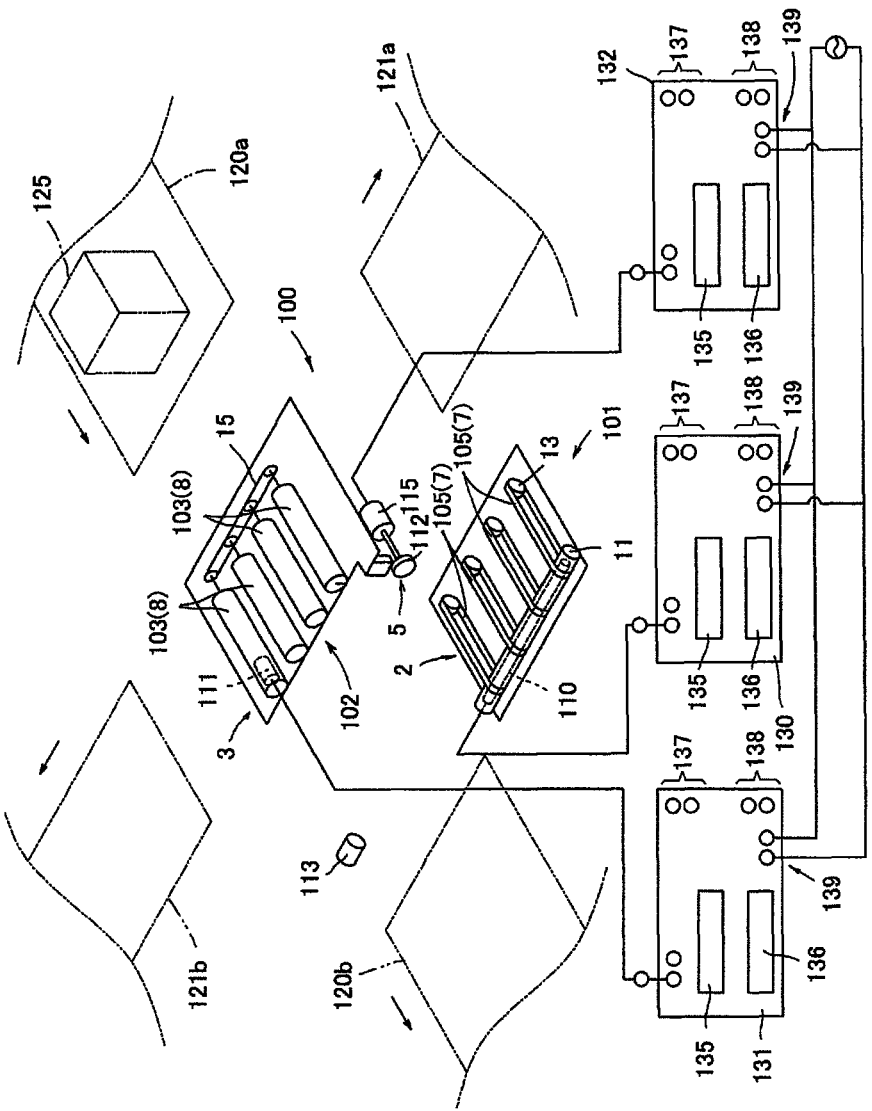
FIG. 10 is an explanatory modeled diagram of a conveying apparatus and a motor controller according to a prior art.

The transfer apparatus controller 50 described above includes three circuits which are the motor drive circuits 52a, 52b, and 52c, and the motor drive circuit 52a, 52b, or 52c which is to be activated is selected by the drive shaft switching circuit 66. However, the present invention is not limited to have the above configuration. One motor drive circuit 52 may be provided, and an output switching circuit 80 may be provided at an output side of the motor drive circuit 52, as illustrated in FIG. 9. In a transfer apparatus controller 81 illustrated in FIG. 9, an output destination of the motor drive circuit 52 is switched among the main conveying power transmission terminal 55, the auxiliary conveying power transmission terminal 56, and the lifting and lowering power transmission terminal 57 by the output switching circuit 80. Specifically, the microcomputer 65 controls on/off of the motor drive circuit 52 and switching action of the output switching circuit 80.

DESCRIPTION OF REFERENCE SIGNS 5 lifting and lowering mechanism (lifting and lowering unit)
7 main conveying surface
8 auxiliary conveying surface
40 upstream object presence sensor (peripheral object presence sensor)
41 downstream object presence sensor (peripheral object presence sensor)
42 right-branching-side object presence sensor (peripheral object presence sensor)
43 left-branching-side object presence sensor (peripheral object presence sensor)
44 body-side object presence sensor
50 transfer apparatus controller
52a,52b,52c motor drive circuit (drive power generation circuit)

55 main conveying power transmission terminal
56 auxiliary conveying power transmission terminal
57 lifting and lowering power transmission terminal
65 microcomputer (control device)
66 output switching circuit (drive shaft switching circuit)
70 signal input terminal group (signal input unit)
71 signal output terminal group (signal output unit)
76 power feed terminal
80 output switching circuit
100 transfer apparatus
101 main conveying passage
102 auxiliary conveying passage
110 main conveying motor
111 auxiliary conveying motor
113 conveying surface position detection sensor (conveying surface position detection unit)
115 lifting and lowering motor (lifting and lowering power source)
120a upstream conveyer (conveyer apparatus)
120b downstream conveyer (conveyer apparatus)
121a right branching conveyer (conveyer apparatus)
121b left branching conveyer (conveyer apparatus)
125 conveyed object

The invention claimed is:

1. In combination:
a) conveying apparatus comprising:
   a first conveyer that defines a main conveying line;
   a second conveyer that defines a branching line;
   a branch section or convergence section;
   a host control device;
   a first other control device that controls the first conveyer; and
   a second other control device that controls the second conveyer;
b) a transfer apparatus that is mounted on the branch section or the convergence section, the transfer apparatus comprising:
   a main conveying passage that conveys a conveyed object in one direction;
   an auxiliary conveying passage that is located in a same planar region as the main conveying passage and conveys a conveyed object in a direction crossing the main conveying passage;
   a lifting and lowering unit that lifts or lowers at least one of the conveying passages so as to set a conveying surface of the at least one of the conveying passages to be located above a conveying surface of the other of the conveying passages;
   a main conveying motor that drives the main conveying passage;
   an auxiliary conveying motor that drives the auxiliary conveying passage; and
   a lifting and lowering power source that drives the lifting and lowering unit; and
c) a transfer apparatus controller comprising:
   a main conveying power transmission terminal; an auxiliary conveying power transmission terminal; a lifting and lowering power transmission terminal; a power feed terminal to which power is fed; a signal input unit; and one or more drive power generation circuits,
   wherein the signal input unit is configured to input at least a conveyed object feed request signal, a discharge allowance signal, and a discharge direction instruction signal that includes at least a signal indicating curved conveyance for changing a conveying direction, from at least one of the host control device, the adjacent first other control device, and the adjacent second other control device,
   wherein the transfer apparatus controller performs a feeding action to supply power from the drive power generation circuit to either one of the main conveying power transmission terminal and the auxiliary conveying power transmission terminal, at least under the condition that the conveyed object feed request signal is input,
   wherein the transfer apparatus controller performs a conveying passage switching action to supply power from the drive power generation circuit to the lifting and lowering power transmission terminal, under the condition that the discharge direction instruction signal indicates the curved conveyance, and
   wherein the transfer apparatus controller performs a discharging action to supply power from the drive power generation circuit to one of the conveying power transmission terminals connected to one of the conveying motors, the one of the conveying motors driving a conveying surface of one of the conveying passages that is located upper, under the condition that the discharge allowance signal is input.

2. The combination according to claim 1, further comprising a signal output unit that transmits a signal indicating whether a conveyed object can be fed into the transfer apparatus or not, to the outside.

3. The combination according to claim 1,
wherein the transfer apparatus further comprises a conveying surface position detection unit that detects which is at an upper position between a main conveying surface that is a conveying surface of the main conveying passage and an auxiliary conveying surface that is a conveying surface of the auxiliary conveying passage, and
wherein the signal input unit of the transfer apparatus controller is configured to input a signal from the conveying surface position detection unit.

4. The combination according to claim 1,
wherein the discharge direction instruction signal includes a linear conveying signal for linearly conveying a conveyed object, and
wherein when the discharge direction instruction signal indicates linear conveyance, the transfer apparatus controller performs the feeding action and the discharging action without performing the conveying passage switching action.

5. The combination according to claim 1,
wherein at least one of the drive power generation circuits can generate forward drive power for rotating a motor forward and backward drive power for rotating the motor backward,
wherein the discharge direction instruction signal includes a right curve conveying signal for conveying a conveyed object to the right with curved conveyance and a left curve conveying signal for conveying a conveyed object to the left with curved conveyance, and
wherein power generated from the drive power generation circuit is switched between the forward drive power and the backward drive power, responding to whether the right curve conveying signal is input or whether the left curve conveying signal is input.

6. The combination according to claim 1,
wherein the transfer apparatus further comprises a body-side object presence sensor that detects whether a conveyed object is present or not on the transfer apparatus, and
wherein the transfer apparatus controller is configured to input a signal from the body-side object presence sensor.

7. The combination according to claim 6,
wherein the transfer apparatus controller performs the feeding action at least under the condition that absence of a conveyed object on the transfer apparatus is confirmed by the body-side object presence sensor.

8. The combination according to claim 1,
wherein a peripheral object presence sensor that detects whether a conveyed object is present or not on a conveying passage is configured around the transfer apparatus, and
wherein the transfer apparatus controller is configured to input a signal from the peripheral object presence sensor.

9. The combination according to claim 8,
wherein the transfer apparatus controller performs the discharging action at least under the condition that absence of a conveyed object on a conveying passage at a discharge side is confirmed by the peripheral object presence sensor.

10. The combination according to claim 1, further comprising three or more drive power generation circuits and a control device,
wherein each of the drive power generation circuits is connected to the main conveying power transmission terminal, the auxiliary conveying power transmission terminal, and the lifting and lowering power transmission terminal, and
wherein the control device activates any of the drive power generation circuits according to a signal input from the signal input unit.

11. The combination according to claim 1, further comprising: one or more drive power generation circuits; an output switching circuit; and a control device,
wherein the output switching circuit is connected to the drive power generation circuit and two or more power transmission terminals, and
wherein the control device activates the output switching circuit according to a signal input from the signal input unit to supply power to any of the two or more power transmission terminals.

12. The combination according to claim 1, wherein the conveying passage to which a conveyed object is fed and a feeding direction are selectable.

13. The combination according to claim 1, wherein the feeding action for supplying power to the main conveying power transmission terminal from the drive power generation circuit is started or continued under the condition that the following first conditions are all satisfied and any of the following second conditions is satisfied, the first conditions being:
(1) at least the main conveying passage out of the main conveying passage and the auxiliary conveying passage is located at a top position; and
(2) the conveyed object feed request signal is input,
the second conditions being:
(1) the feeding action for supplying power to the main conveying power transmission terminal from the drive power generation circuit is actually implemented;
(2) the discharge allowance signal is input; and
(3) a conveyed object is not present on the transfer apparatus.

14. The combination according to claim 1, wherein the feeding action for supplying power to the main conveying power transmission terminal from the drive power generation circuit is started or continued under the condition that:
(1) at least the main conveying passage out of the main conveying passage and the auxiliary conveying passage is located at a top position;
(2) the discharge allowance signal is input; and
(3) a conveyed object is present on the transfer apparatus.

15. The combination according to claim 1, wherein power supply to the auxiliary conveying power transmission terminal from the drive power generation circuit is started under the condition that:
(1) at least the auxiliary conveying passage out of the main conveying passage and the auxiliary conveying passage is located at a top position;
(2) the discharge direction instruction signal indicating curved conveyance is input;
(3) a conveyed object is present on the transfer apparatus; and
(4) the discharge allowance signal is input.

16. The combination according to claim 1, wherein the conveying passage switching action for supplying power to the lifting and lowering power transmission terminal from the drive power generation circuit is started under the condition that the following first condition is satisfied and the following second condition is satisfied, the first condition being:
(1) at least the auxiliary conveying passage out of the main conveying passage and the auxiliary conveying passage is located at a top position, the second condition being:
(1) in the state in which the first condition is satisfied, power supply to the auxiliary conveying power transmission terminal has been performed.

17. The combination according to claim 1, wherein the conveying passage switching action for supplying power to the lifting and lowering power transmission terminal from the drive power generation circuit is started under the condition that:
(1) at least the main conveying passage out of the main conveying passage and the auxiliary conveying passage is located at a top position;
(2) the discharge direction instruction signal indicating curved conveyance is input; and
(3) a conveyed object is present on the transfer apparatus.

18. The combination according to claim 1,
wherein the transfer apparatus is provided between the main conveying line and the branching line, and
wherein the conveyed object feed request signal is input to the signal input unit of the transfer apparatus controller when a conveyed object is present on an upstream line of the main conveying line just before the transfer apparatus.

19. The combination according to claim 1,
wherein the transfer apparatus is provided between the main conveying line and the branching line, and
wherein the discharge allowance signal is input to the signal input unit of the transfer apparatus controller in the event that either:
(1) a conveyed object is not present at the position closest to the transfer apparatus on either one of the main conveying line and the branching line that is designated as a discharge destination; or (2) the conveying line that is the closest to the transfer apparatus and that is designated as the discharge destination is driven.

20. A transfer apparatus controller that operates only one transfer apparatus, the transfer apparatus comprising:
a main conveying passage that conveys a conveyed object in one direction;
an auxiliary conveying passage that is located in a same planar region as the main conveying passage and conveys a conveyed object in a direction crossing the main conveying passage;
a lifting and lowering unit that lifts or lowers at least one of the conveying passages so as to set a conveying surface of the at least one of the conveying passages to be located above a conveying surface of the other of the conveying passages;
a main conveying motor that drives the main conveying passage;
an auxiliary conveying motor that drives the auxiliary conveying passage; and
a lifting and lowering power source that drives the lifting and lowering unit,
the transfer apparatus controller comprising therein: a main conveying power transmission terminal; an auxiliary conveying power transmission terminal; a lifting and lowering power transmission terminal; a power feed terminal to which power is fed; a signal input unit; three or more drive power generation circuits; and a control device that includes a microcomputer,
wherein each of the drive power generation circuits is connected to the main conveying power transmission terminal, the auxiliary conveying power transmission terminal, and the lifting and lowering power transmission terminal,
wherein the signal input unit is configured to input at least a conveyed object feed request signal, a discharge allowance signal, and a discharge direction instruction signal that includes at least a signal indicating curved conveyance for changing a conveying direction, from a host control device or a control device of an adjacent conveyer,
wherein the control device activates any of the drive power generation circuits according to a signal input from the signal input unit,
wherein the transfer apparatus controller performs a feeding action to supply power from the drive power generation circuit to either one of the main conveying power transmission terminal and the auxiliary conveying power transmission terminal, at least under the condition that the conveyed object feed request signal is input,
wherein the transfer apparatus controller performs a conveying passage switching action to supply power from the drive power generation circuit to the lifting and lowering power transmission terminal, under the condition that the discharge direction instruction signal indicates the curved conveyance, and
wherein the transfer apparatus controller performs a discharging action to supply power from the drive power generation circuit to one of the conveying power transmission terminals connected to one of the conveying motors, the one of the conveying motors driving a conveying surface of one of the conveying passages that is located upper, under the condition that the discharge allowance signal is input.

21. The transfer apparatus controller according to claim 20, further comprising a signal output unit that transmits a signal indicating whether a conveyed object can be fed into the transfer apparatus or not, to the outside.

22. The transfer apparatus controller according to claim 20,
wherein the transfer apparatus further comprises a body-side object presence sensor that detects whether a conveyed object is present or not on the transfer apparatus,
wherein the transfer apparatus controller is configured to input a signal from the body-side object presence sensor, and
wherein the transfer apparatus controller performs the feeding action at least under the condition that absence of a conveyed object on the transfer apparatus is confirmed by the body-side object presence sensor.

23. The transfer apparatus controller according to claim 20,
wherein a peripheral object presence sensor that detects whether a conveyed object is present or not on a conveying passage is configured around the transfer apparatus,
wherein the transfer apparatus controller is configured to input a signal from the peripheral object presence sensor, and
wherein the transfer apparatus controller performs the discharging action at least under the condition that absence of a conveyed object on a conveying passage at a discharge side is confirmed by the peripheral object presence sensor.

24. A transfer apparatus controller that operates only one transfer apparatus, the transfer apparatus comprising:
a main conveying passage that conveys a conveyed object in one direction;
an auxiliary conveying passage that is located in a same planar region as the main conveying passage and conveys a conveyed object in a direction crossing the main conveying passage;
a lifting and lowering unit that lifts or lowers at least one of the conveying passages so as to set a conveying surface of the at least one of the conveying passages to be located above a conveying surface of the other of the conveying passages;
a main conveying motor that drives the main conveying passage;
an auxiliary conveying motor that drives the auxiliary conveying passage; and
a lifting and lowering power source that drives the lifting and lowering unit,
the transfer apparatus controller comprising therein: a main conveying power transmission terminal; an auxiliary conveying power transmission terminal; a lifting and lowering power transmission terminal; a power feed terminal to which power is fed; a signal input unit; one or more drive power generation circuits; an output switching circuit; and a control device that includes a microcomputer,
wherein the output switching circuit is connected to the drive power generation circuit and two or more power transmission terminals,
wherein the signal input unit is configured to input at least a conveyed object feed request signal, a discharge allowance signal, and a discharge direction instruction signal that includes at least a signal indicating curved conveyance for changing a conveying direction, from a host control device or a control device of an adjacent conveyer, wherein the control device activates the output switching circuit according to a signal input from the signal input unit to supply power to any of the two or more power transmission terminals, wherein the transfer apparatus controller performs a feeding action to supply power from the drive power generation circuit to either one of the main conveying power transmission terminal and the auxiliary conveying power transmission terminal, at least under the condition that the conveyed object feed request signal is input, wherein the transfer apparatus controller performs a conveying passage switching action to supply power from the drive power generation circuit to the lifting and lowering power transmission terminal, under the condition that the discharge direction instruction signal indicates the curved conveyance, and wherein the transfer apparatus controller performs a discharging action to supply power from the drive power generation circuit to one of the conveying power transmission terminals connected to one of the conveying motors, the one of the conveying motors driving a conveying surface of one of the conveying passages that is located upper, under the condition that the discharge allowance signal is input.

25. The transfer apparatus controller according to claim 24, further comprising a signal output unit that transmits a signal indicating whether a conveyed object can be fed into the transfer apparatus or not, to the outside.

26. The transfer apparatus controller according to claim 24, wherein the transfer apparatus further comprises a body-side object presence sensor that detects whether a conveyed object is present or not on the transfer apparatus, wherein the transfer apparatus controller is configured to input a signal from the body-side object presence sensor, and wherein the transfer apparatus controller performs the feeding action at least under the condition that absence of a conveyed object on the transfer apparatus is confirmed by the body-side object presence sensor.

27. The transfer apparatus controller according to claim 24, wherein a peripheral object presence sensor that detects whether a conveyed object is present or not on a conveying passage is configured around the transfer apparatus, wherein the transfer apparatus controller is configured to input a signal from the peripheral object presence sensor, and wherein the transfer apparatus controller performs the discharging action at least under the condition that absence of a conveyed object on a conveying passage at a discharge side is confirmed by the peripheral object presence sensor.

* * * * *